Sept. 29, 1964  R. H. SPENGLER ETAL  3,150,551
CONVERTIBLE HYDRAULICALLY OPERATED SHEAR UNIT
Filed Jan. 6, 1959  5 Sheets-Sheet 2
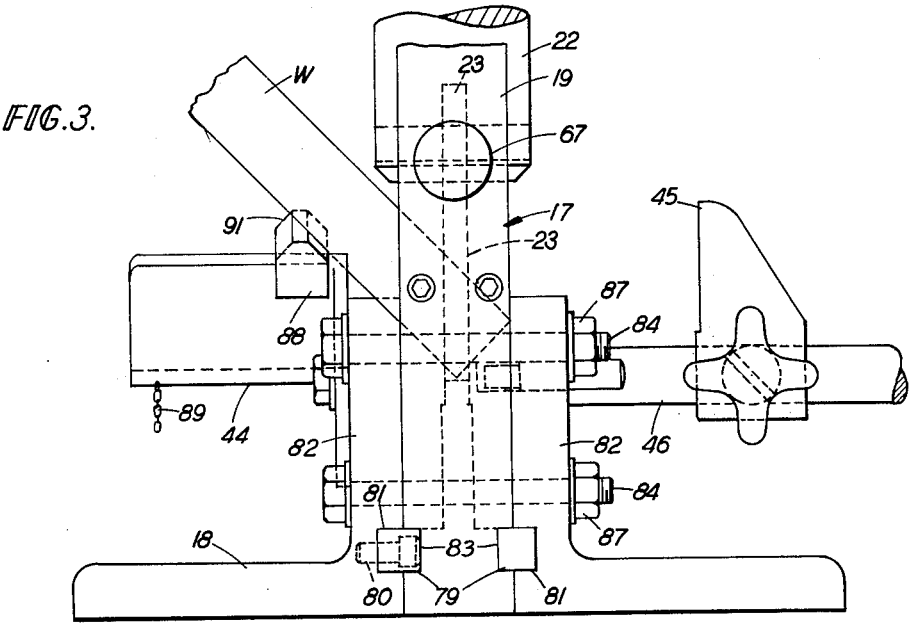
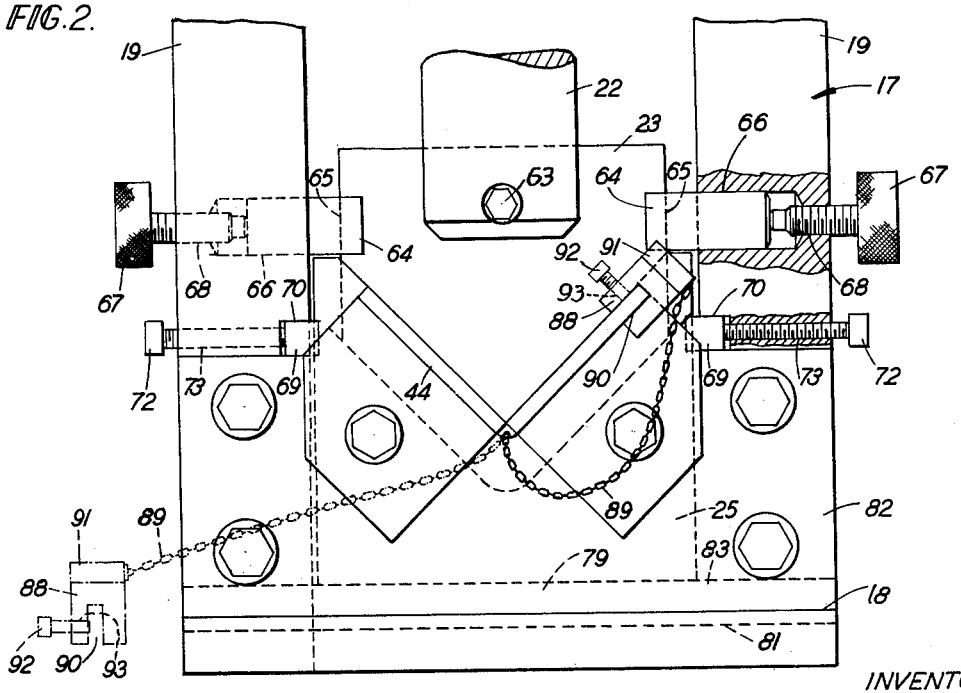

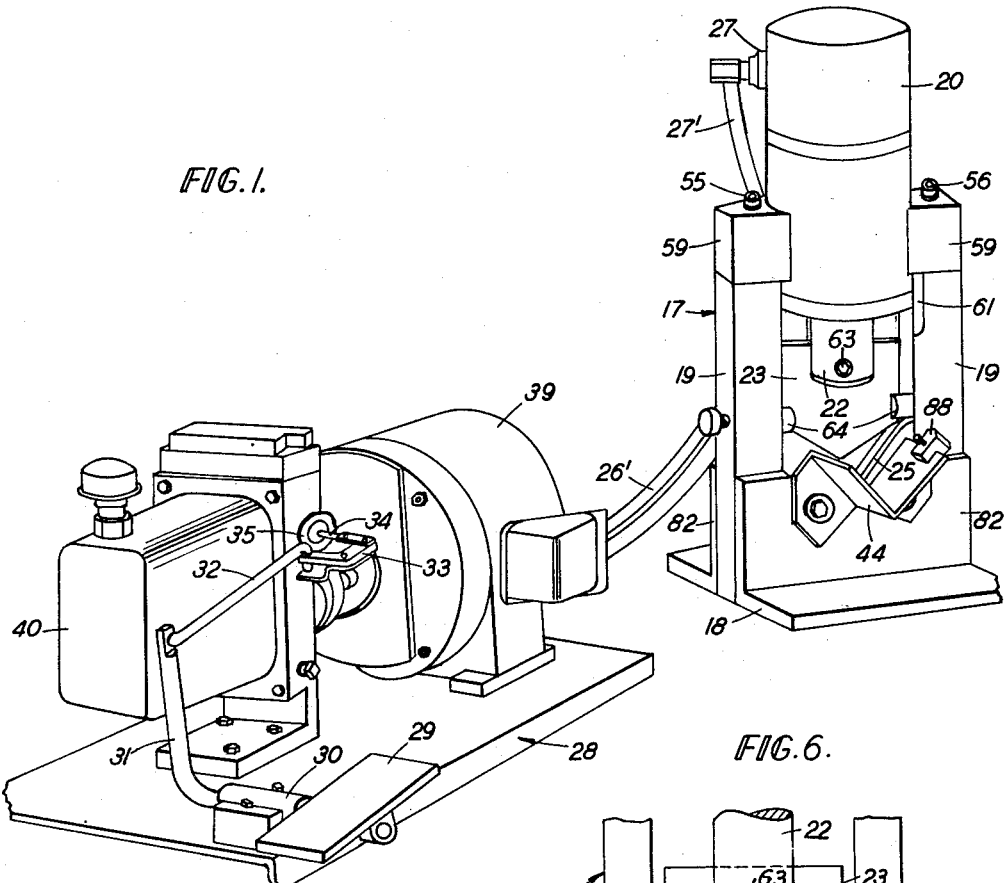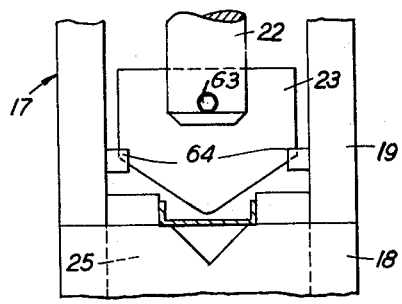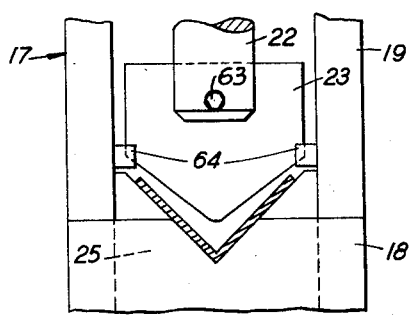

Sept. 29, 1964  R. H. SPENGLER ETAL  3,150,551
CONVERTIBLE HYDRAULICALLY OPERATED SHEAR UNIT
Filed Jan. 6, 1959  5 Sheets-Sheet 3

INVENTORS
ROBERT H. SPENGLER
TED F. BROLUND
BY
ATTORNEY

Sept. 29, 1964  R. H. SPENGLER ETAL  3,150,551
CONVERTIBLE HYDRAULICALLY OPERATED SHEAR UNIT
Filed Jan. 6, 1959  5 Sheets-Sheet 4

INVENTORS
ROBERT H. SPENGLER
TED F. BROLUND
BY
ATTORNEY

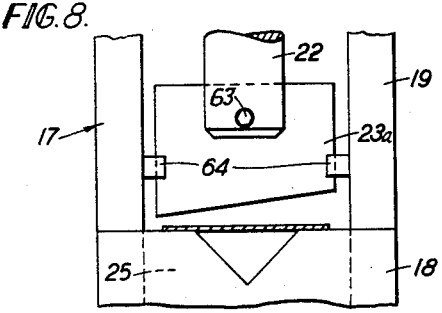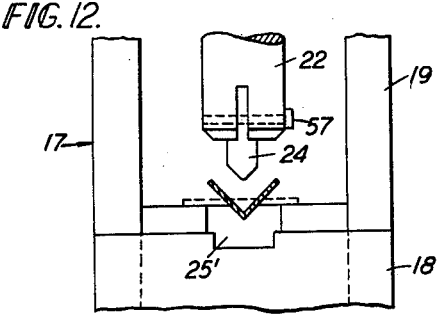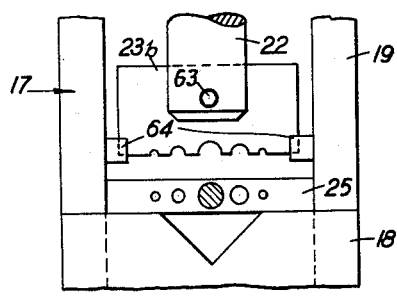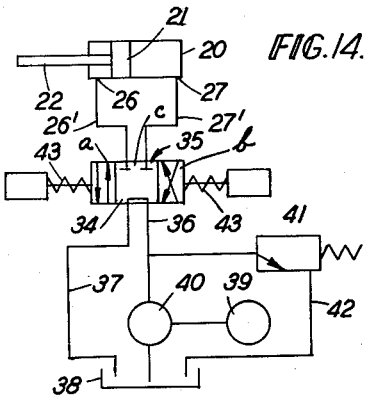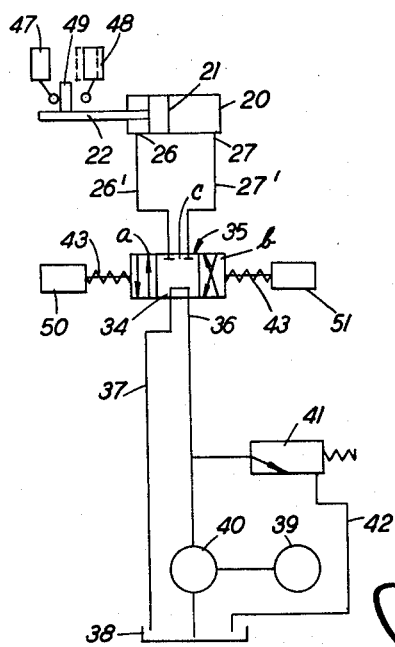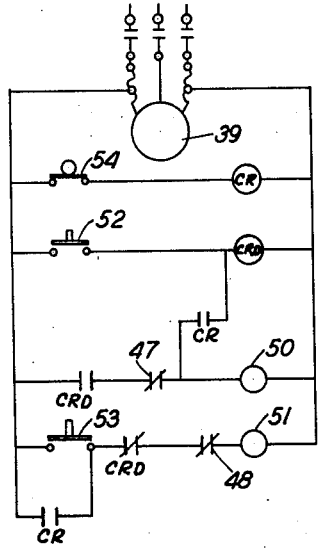

United States Patent Office 3,150,551
Patented Sept. 29, 1964

3,150,551
CONVERTIBLE HYDRAULICALLY OPERATED SHEAR UNIT
Robert H. Spengler and Ted F. Brolund, Rockford, Ill., assignors to W. A. Whitney Mfg. Co., Rockford, Ill., a corporation of Illinois
Filed Jan. 6, 1959, Ser. No. 785,210
3 Claims. (Cl. 83—635)

This invention relates to a multiple duty, hydraulically-operated device which, while referred to for convenience as a hydraulic angle iron shear unit, is readily convertible to a channel iron shear, or to a rod cutter, or to a flat stock shear, or to a press brake or bar brake, or to a pipe notcher, these devices having found these and other uses in sheet metal, ornamental iron, structural steel, and light manufacturing processes.

The device of our invention is adapted to be hydraulically powered by a foot treadle controlled power-pack connected by flexible conduits with the cylinder of the device, so that the device may be placed to best advantage for a given job and to best suit the operator, and, with the foot control, one man can locate the work and also operate the shear with a minimum of effort, the device having truly tremendous power and manufacturing capacity despite its relatively small size, and being thoroughly practical and safe to use because the operator can cause the ram to advance, stop, continue to advance, or back up from any point in the cycle. Spoilage of work is consequently reduced to a minimum.

The hydraulic cylinder of the device, which is usually disposed vertically for up and down movement of the ram, can be swung to and from its operative position on a vertical axis defined by one of two tie-rod screws that normally secure the cylinder firmly to the tops of two vertical columns, the screw employed as a pivot being merely loosened and the other being removed to permit the cylinder to swing, the cylinder when swung to an out of the way position leaving the upper end of the tool space between the columns open for easy tool changing. The shear blade is fastened to the lower end of the ram by a removable dowel pin retained in place by a set screw so that it is a simple matter to prepare for the swinging movement of the cylinder, and the blade can be removed and replaced easily and in very little time. Blade guides slidably adjustably mounted in the columns on opposite sides of the tool space afford a simple but effective means for guiding the shear blade to prevent its turning out of the proper plane, these guides also acting as take-up blocks to assume side-thrust in cutting non-symmetrical work. The guides are accurately adjustable by screws projecting horizontally from the outer sides of the columns but can be removed to leave the full tool space clear, which is of advantage when using the press brake dies. The lower die body, which is clamped between the lower portions of the columns and is entered in vertical notches in clamp blocks slidably mounted in horizontal grooves provided in the inner sides of the columns, can be finely adjusted to true parallel relationship to the shear blade before the clamp screws threaded in holes in the columns are tightened. Thus, either side of the die body can be adjusted separately and the screws not tightened until the exact desired positioning of the die body has been obtained.

The angle iron dies employed are designed for shearing a number of different shapes of work, including angle iron, flat stock, square tubing, square stock, small bar sized channel iron, and even round rods, if slight distortion is permissible. The angle iron dies are designed so that they can be resharpened several times without loss of accuracy or causing a bur on the work. The inserts on these dies are also designed to prevent chipping in the V.

Miter cuts are possible with the angle iron dies without change of tooling, a miter block being provided for this purpose that is attachable to and slidably adjustable on either side of the V-shaped angle iron support secured to and projecting forwardly from the upright portion of the base plate whereby to provide support for the work inserted at the necessary angle relative to the plane of operation of the shear blade. Thus, right and left hand 45° miters can be cut and when matched together will form an accurate 90° corner, for example, using angle iron, flat stock, square tubing, and small bar sized channels.

The standard up and down cycle of the device is obtained with a spring-centered, foot operated, four-way directional valve the spool of which is shiftable by pressing down on either side of a foot treadle to direct fluid to either end of the cylinder to raise or lower the ram and accordingly operate the shear blade attached to the ram. However, a semi-automatic cycle is possible with a solenoid-controlled four-way valve and the necessary electrical relays and limit switches, the limit switches being mounted on the shear unit so as to control automatically the travel of the ram in either direction. Complete control of the operation of the shear blade is also optional by switching the unit to what is known as the "jog" cycle.

With a single power-pack it is possible, due to the unit construction of the present device, to have an assembly of two or more shear units operated as a combination unit from the one power source. Also, flexible conduits can be extended from opposite sides of the power-pack to two separate shear units to operate the same as a pair or as independent units, the two units being equipped with the same or different tooling, thus enabling a substantial saving in the original investment for such a combination, as compared to double the cost of a single shear unit with attached power-pack.

The invention is illustrated in the accompanying drawings, in which—

FIG. 1 is a perspective view of a shear unit made in accordance with our invention and its associated power-pack, including the foot control;

FIGS. 2 and 3 are a front view and side view, respectively, of the lower half portion of the shear unit, on a larger scale;

FIGS. 5 and 6 are diagrammatic views along the lines of FIG. 2 showing the same V-pointed shear blade being used for cutting pieces of angle iron and channel iron, respectively;

FIG. 8 is a view similar to FIGS. 5–6 showing another shear blade 23a used preferably in cutting flat stock;

FIG. 10 is another view similar to FIGS. 5–6 showing another shear blade 23b used preferably in cutting rod and tube material of different sizes;

FIG. 12 is still another view similar to FIGS. 5–6 showing the use in lieu of a shear blade, of a die 24' for a press brake job;

Similar reference numerals are applied to corresponding parts throughout the views.

Figure 4:
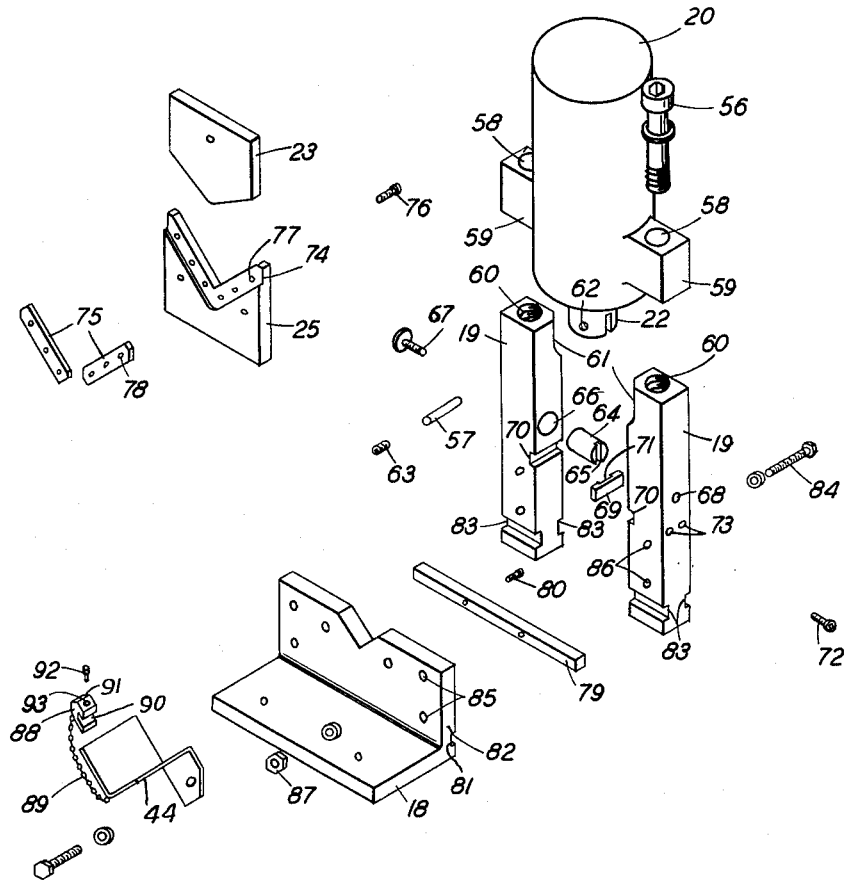
FIG. 4 is an exploded perspective view of most of the parts seen in FIGS. 2 and 3 to better illustrate their form and how they are adapted to cooperate with one another.
Figure 7:
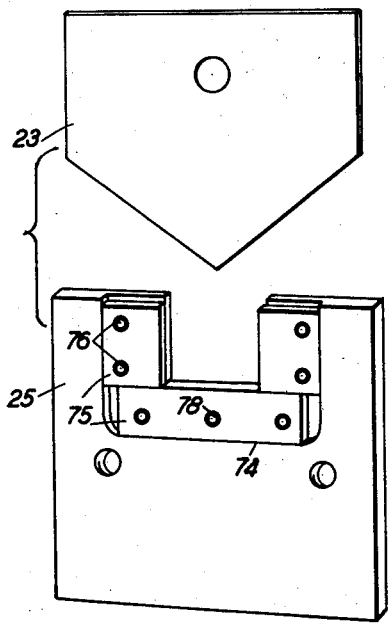
FIG. 7 is a perspective view of the shear blade 23 and lower die used in connection therewith for a channel iron cutting job similar to that shown in FIG. 6, the inner side of the lower die being shown here in order to disclose the die inserts fixed in the depression provided therefor in the lower die body or die holder.
Figure 9:
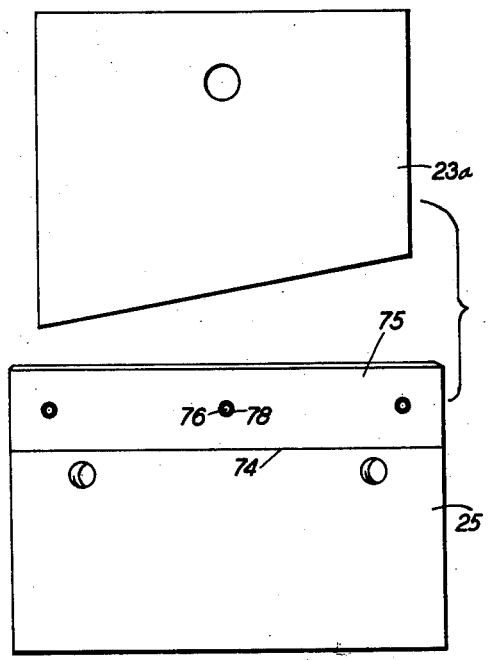
FIG. 9 is a perspective view of the tooling for FIG. 8.
Figure 11:
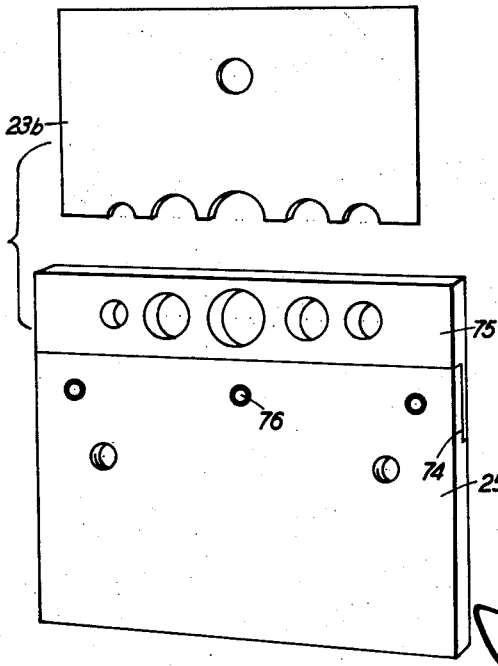
FIG. 11 is a perspective view of the tooling for FIG. 10.
Figure 13:
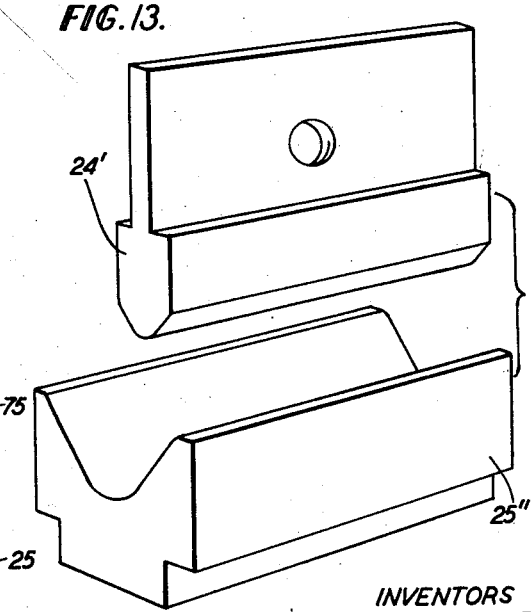
FIG. 13 is a perspective view of tooling similar to that required for FIG. 12, and FIGS. 14–16 are hydraulic, electrical, and combination electrical and hydraulic circuit diagrams for the manual cycle (FIG. 14), and the semi-automatic and "jog" cycles (FIGS. 15–16).

Referring first to FIGS. 1–4, the reference numeral 17 designates the shear unit of our invention generally, which includes a base 18, parallel vertical columns 19 rigid with the base, and a cylinder 20 mounted rigidly on top of said columns and having a piston operated hydraulically and reciprocable therein, indicated at 21 in FIGS. 14 and 15, to give reciprocatory movement to the ram 22 and accordingly operate the shear blades 23, 23a, 23b, or other tool or die 24 (FIGS. 12–13) on its working and return strokes with respect to the lower die 25. The form and construction of the lower die depends on what the cutting job requires and what tooling is mounted on the ram to cooperate therewith. Thus, the lower dies 25 shown in FIGS. 7, 9 and 11 are all similar only from the one standpoint that they are used in combination with shearing blades 23, 23a and 23b, respectively, for shearing operations, whereas the lower die 25' shown in FIG. 12 and that shown at 25" in FIG. 13 are for bending and forming operations and are necessarily quite different from the other lower dies used for shearing, as are also the dies 24 and 24' which cooperate therewith quite different from the shear blades 23, 23a and 23b. The piston 21 is reciprocated under the pressure of oil admitted to one end of the cylinder, as at 26 (FIGS. 14–15), and discharged at the other end, as at 27, or vice versa, the flexible tubes for conducting the oil under pressure communicating with the parts 26–27 being numbered 26' and 27' in FIG. 1 and FIGS. 14–15, and extending to the cylinder 20 from the power-pack unit 28. The latter has an additional pair of parts closed by removable plugs where another pair of flexible hose connections may be attached if one power-pack is to be used for the operation of two shear units 17. Furthermore, each of the conduits 26'–27' may have branches extending to the cylinders 20 of as many units 17 as there are branches provided in said conduits.

A treadle 29 is oscillatably mounted at 30 on the base of the power-pack 28 and oscillates an arm 31, the upper end of which is connected by a link 32 with one arm of a bell-crank 33, the other arm of which is link-connected to the reciprocable spool 34 (FIGS. 14–15) of a spring-centered four-way directional valve 35. Thus, when the operator presses down on the front or toe end of the treadle 29 the portion $a$ of spool 34 (FIGS. 14–15) delivers oil under pressure through line 36 and port 27 into the rear (or upper) end of cylinder 20 to move the piston 21 forward (or down), oil ahead of the piston being discharged through port 26 and line 37 back to the sump 38, assuming, of course, that the electric motor 39 has been turned on and is driving the fixed displacement pump 40 to supply oil from the sump 38 to line 36 under pressure. When the piston 21 reaches the limit of its forward movement in cylinder 20, a pressure relief valve 41 communicating with the line 36 opens when the pressure builds up to a predetermined maximum, allowing oil to be bypassed through line 42 back to the sump 38, as shown in FIG. 14. Hence, the operator can keep the treadle 29 depressed as long as he cares to, without any harm to any part of the power-pack 28. The same relief valve 41 will, of course, open automatically in the event of an over-load, as in the event the operator inserts work beyond the capacity of the shear unit 17 and which might otherwise result in:

(a) Breakage of a part of the shear unit 17;
(b) Damage to the motor 39, or
(c) Injury to the operator.

When the operator reverses the position of the treadle 29 by depressing the rear or heel portion, the other portion $b$ of spool 34 (FIGS. 14–15) is moved into communication with lines 36 and 37, allowing oil under pressure to enter the front (or lower) end of cylinder 20 through port 26 while oil is discharged from the other end through port 27 and returned to the sump 38 through line 37. Here again, when the piston 21 reaches the rear end of the cylinder, oil pressure building up in line 36 is relieved automatically by relief valve 41 in the event the operator keeps the treadle 29 depressed. At 43 are indicated springs for automatically returning the treadle 29 with the spool 34 to neutral position when foot pressure on the treadle is released, the spool 34 in that position having its portion $c$ (FIGS. 14–15) blocking fluid flow in either direction to or from cylinder 20, and, under these conditions, relief valve 41 remains open so long as the motor 39 runs, bypassing oil through line 42 to the sump 38.

In operation, whenever the shear unit 17 is to be used the operator presses a "start" button on a switch (not shown) to run motor 39 and operate pump 40. Whenever the "stop" button on the same switch is depressed when the shear unit 17 is no longer to be used, the motor 39 stops. Assuming the work to be cut off is placed in the shear unit supported between the shear blade 23, 23a or 23b, and lower die 25 by a V-support 44 and located properly by engagement with a stop 45, adjustable horizontally in a fore and aft direction on a support 46; the operator need only depress the front or toe portion of treadle 29 to cause the ram 22 to be moved downwardly on its working stroke. Should the operator detect anything wrong in the set-up at the last second, he can stop the ram 22 instantly by merely releasing foot pressure on treadle 29, and can, if he desires, cause the ram 22 to be retracted, by depressing the rear or heel portion of treadle 29, and in that way much costly spoilage of material is prevented. The fact that the power is obtained by foot pressure on the treadle, and the working stroke and return stroke are so easily controlled by foot-action makes it easy for the operator to handle a lot more work in a given time than would be possible with other units designed differently, and without fatigue, and, because the operator has his both hands free to handle the work, there is less likelihood of any work being spoiled. The treadle control is actually so precise, an experienced operator can run the shear blade 23, 23a or 23b, down to light contact with the work to merely mark the cut and then retract the blade, so that the operator can check the mark on the work and, if necessary, adjust it one way or the other before making the final cut. That is a great advantage and accounts for a considerable reduction in spoilage. The power-pack 28 can be located at any convenient distance from the shear unit 17, making the treadle 29 easily accessible to the operator and in whatever position relative to the shear unit he prefers. The built-in relief valve 41 makes the operation virtually fool-proof, besides avoiding danger of damage to the shear unit or the electric motor and greatly reducing any likelihood of injury to the operator.

Referring to FIGS. 15–16, semi-automatic and "jog" operation is obtainable by merely removing the treadle 29 and adding the two limit switches 47 and 48 as shown in FIG. 15, operable by a dog 49 moving with the ram 22 and shear blade 23, 23a or 23b, and providing the solenoids 50 and 51 in lieu of the treadle, and providing additional switches 52, 53 and 54, and relays shown in FIG. 16, the latter three switches being preferably housed together in a control box (not shown) with the buttons therefor labelled "down," "up," and "jog-run," respectively. In semi-automatic operation, if the operator presses the "down" button momentarily, closing switch 52, the shear unit 17 will operate on the working stroke to the point of closing limit switch 47, whereupon the unit operates on the return stroke up to the upper limit switch 48 and stops. The upper limit switch 48 is indicated in FIG. 15 as adjustable toward and away from the fixed lower limit switch 47, so that the stroke of the ram 22 may be shortened or lengthened accordingly to suit the requirements of different jobs. Using the "jog-run" button, which closes switch 54, the operator can cause the shear unit to jog down and stop at any point or jog up and stop at any point, within the limits, of course, of the stroke of the ram which the relative setting of the limit switches 47 and 48 predetermines.

Referring to FIGS. 1–4, the novel features of construction incorporated in the shear unit and mentioned previously will now be pointed out:

(1) Cylinder 20 is swingable like a gate relative to the frame of the shear on either one of its two fastening screws 55 and 56, when one screw is removed and the other is merely loosened sufficiently, the ram 22 having previously been disconnected from the shear blade 23, 23a or 23b, by removal of the dowel pin 57 from the diametrically slotted lower end thereof. The screws 55–56 extend freely through vertical holes 58 provided in ears 59 provided on opposite sides of the cylinder, and thread in vertical holes 60 provided in the upper ends of the columns 19. Inner corner portions of the rectangular section of the upper ends of the columns 19 are cut away as shown at 61 to provide swinging clearance for the cylinder so that it may be swung forwardly on one ear (using screw 56) or rearwardly on the other ear (using screw 55). The dowel pin 57 is preferably tapered and fits wedgingly in a tapered inner end portion of the hole 62 in the ram 22, the outer end portion of which hole is threaded and receives a set screw 63 to retain the pin and tighten it when the set screw is tightened. A drift pin (not shown) entered through the other end of hole 62 can be used to drive out said pin after the set screw 63 is removed. When the cylinder 20 is swung out of the way the upper end of the tool space is open and, with the cylinder out of the way, it is a simple matter to remove a shear blade 23, 23a or 23b, and substitute another, or make any other tooling change. Considerable saving in time and trouble for the operator is realized by virtue of this novel feature.

(2) Blade guides 64, which are in the form of cylindrical plugs having vertical guide slots 65 provided in their inner ends diametrically thereof, are slidably adjustably mounted in horizontal holes 66 provided therefor in the inner sides of the columns 19 in which they fit fairly closely. Screws 67 threaded in the reduced threaded ends 68 of the holes 66 engage the inner ends of the plugs 64 and are adjustable inwardly or outwardly as required to hold the two coaxially opposed guide plugs 64 in the exact spaced relationship needed for best operation of the shear unit. Thus, the shear blade 23, 23a or 23b, is nicely held against turning out of its proper plane, and the guides 64 at the same time serve to assume side thrust toward either column 19 in the cutting of non-symmetrical work, where the thrust is not evenly distributed but is apt to be a little more one way or the other. A further advantage of this construction is that these guide plugs 64 can be removed readily, after removal of the shear blade, to leave the full tool space clear, as when using the press brake dies, as shown, for example, in FIG. 12.

(3) The lower die body 25 is clamped between the lower portions of the columns 19 by means of opposed coplanar horizontal clamp blocks 69 entered in horizontal grooves 70 provided in the inner sides of the columns, the blocks having vertical notches or grooves 71 provided therein on their inner sides closely receiving the edge portions of the die body 25 therein and being laterally adjustable in the grooves 70 so that either or both sides of the lower die 25 can be adjusted in either direction to true parallelism with the shear blade and to the right shearing relationship thereto before the clamp screws 72, of which two are provided for each clamp block at opposite ends thereof and threaded in holes 73 provided therefor in the columns, are tightened. The set-up time is reduced to a minimum with this construction and uniformly good cutting is obtained if the operator is reasonably careful in making the adjustments described. The lower die 25 is in the form of a die-holder with recesses 74 for the mounting of hardened tool steel cutter blade inserts 75 arranged to be fastened by screws 76 entered freely in holes 77 in the die holder and threaded in holes 78 provided in the inserts. This construction enables resharpening of the lower dies several times without loss of accuracy or causing a bur on the work, and the inserts 75 are, of course, replaceable as a set or individually at a fraction of the cost of replacing a whole die. Also with these inserts, we have found that there is less chipping in the V of a V-die. While we have shown in FIGS. 7 and 9 only a single die member 25, it should be understood that in many cases two die members 25 are used in closely spaced parallel relationship and the shear blade 23 or 23a is movable therebetween, the slug cut from the work in the shearing operation dropping down thereto between the die members.

(4) In passing, attention is called to the elongated rectangular keys 79 that are fastened by means of screws 80 in horizontal grooves 81 provided in the inner faces of the two opposed angle base plates 82 forming the base 18 of the shear unit. The heads of the screws 80 are entered in counter-sunk holes in the keys so that they do not project, and the keys project enough from the grooves in the angle base plates to key the columns 19 firmly to the base by tight engagement in horizontal grooves 83 provided in the front and back faces of the columns 19 near the bottom, so that when the bolts 84 entered through holes 85 in the angle base plates 82 and through registering holes 86 in the columns have their nuts 87 tightened on their protruding ends, the whole framework of the shear unit is made quite strong and rigid and the columns 19 are assured of exact parallelism, essential to the proper clamping of the lower die 25 and proper guiding of the shear blade 23, 23a or 23b.

(5) Miter cuts are possible with the angle iron dies 25, without change of tooling, by virtue of the miter block 88 attached by means of a chain 89 to a convenient part of the angle iron or V-support 44 previously mentioned. The block 88 has a groove 90 provided therein transversely of one side for slidable mounting on either side of the angle iron support, the opposite side of the block being bevelled, as shown at 91, to serve as a work support, as seen in FIG. 3, where the work W is disposed in abutment with one of said bevels. The block 88 is adjusted along the top of the support 44 to the point where the work W resting against it, as seen in FIG. 3, is disposed at the desired angle relative to the plane of the shear blade 23, whereupon the set screw 92 threaded in a hole 93 in the block on one side of the groove 90 is tightened to clamp the block to the support 44. The inner end of the work W rests in the crotch of the V in the lower die 25 and is therefore more or less wedgingly engaged as the shear blade 23 moves down on the working stroke, and the miter cut is made without danger of the work slipping. Thus, for example, right and left hand 45° miters can be cut and when matched together will form an accurate 90° corner, using angle iron, flat stock, square tubing, and small bar sized channels. In the cutting of round stock a single die member 25, like that shown in FIG. 11, is used on that side of the shear blade 23b toward the work support 44.

It is believed the foregoing description conveys a good understanding of the objects and advantages of our invention. The appended claims have been drawn to cover all legitimate modifications and adaptations.

We claim:

1. In a device of the character described comprising a base, spaced vertical columns supported thereon in rigid relationship to one another, a vertical cylinder rigidly mounted on the upper end portions of said columns and having a ram reciprocable vertically therein midway between said columns, and a shear blade detachably mounted on said ram, the improvement which consists in opposed guides for said blade slidably engaging the same on opposite sides and adjustably mounted on said columns for horizontal in and out adjustment to make fine adjustments of the blade laterally relative to the columns and support the blade against lateral deflection in operation, means fixing said guides in adjusted relationship to said columns, a work support rigid with the base and columns, a two-part die member between the two parts of which the blade operates in shearing relationship thereto in a working stroke relative to the work support, opposed clamps for the two parts of the die member adjustable horizontally in and out relative to the lower portions of said columns and also in a lateral direction so that either part of the die member may be adjusted to a fine degree independently of the other part to a desired precise relationship to the blade and work holder, and means fixing said clamps in adjusted relationship to said columns.

2. A device as set forth in claim 1, wherein each of the blade guides comprises a cylindrical plug slidable horizontally with a close working fit in a horizontal cylindrical bore provided therefor in the adjacent column on the inner side thereof, the plug having a vertical groove provided in the inner end diametrically thereof for slidably guiding a vertical edge portion of a blade therein, the means for fixing each of said guides in adjusted position comprising a screw threaded in a horizontal hole provided therefor in the column registering with the bore, the screw being adjustable from the outer side of the column toward and away from the inner end of the plug.

3. A device as set forth in claim 1, wherein each of the clamps for the die member comprises a clamp block of rectangular cross-section slidably received with a close working fit in a horizontal groove provided therefor in the inner side of the related column and having a vertical groove in the inner side thereof for engagement therein of a vertical edge portion of a die member, the means for fixing said clamps in adjusted position comprising adjustable screw threaded means threaded in holes provided therefor in the columns registering with the block receiving grooves, said means being adjustable from the outer side of the columns.

References Cited in the file of this patent

UNITED STATES PATENTS

| | | |
|---|---|---|
| 162,292 | Rimbold | Apr. 27, 1875 |
| 402,381 | Aiken | Apr. 30, 1889 |
| 472,559 | Steudle | Apr. 12, 1892 |
| 584,664 | Bell | June 15, 1897 |
| 649,112 | Smith | May 8, 1900 |
| 671,529 | Swift | Apr. 9, 1901 |
| 847,526 | Taylor | Mar. 19, 1907 |
| 848,330 | Venney | Mar. 26, 1907 |
| 899,297 | Erickson | Sept. 22, 1908 |
| 1,675,563 | Klohe | July 3, 1928 |
| 1,856,359 | Stanton | May 3, 1932 |
| 1,954,651 | Sherman | Apr. 10, 1934 |
| 2,051,447 | Johansen | Aug. 18, 1936 |
| 2,269,914 | Parker | Jan. 13, 1942 |
| 2,467,585 | Finklestein | Apr. 19, 1949 |
| 2,504,347 | O'Donnell | Apr. 18, 1950 |
| 2,633,767 | Strange | Apr. 7, 1953 |
| 2,816,608 | Farmwald | Dec. 17, 1957 |
| 2,879,843 | Conoglio | Mar. 31, 1959 |

FOREIGN PATENTS

| | | |
|---|---|---|
| 15,560 | Norway | July 4, 1905 |